(12) United States Patent
Grimm et al.

(10) Patent No.: US 9,140,553 B2
(45) Date of Patent: Sep. 22, 2015

(54) METHOD FOR ASSISTING A DRIVER OF A MOTOR VEHICLE WHEN PARKING IN A PARKING SPACE, DRIVER ASSISTANCE DEVICE AND A MOTOR VEHICLE

(75) Inventors: Oliver Grimm, Flein (DE); Nicolas Jecker, Esslingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 244 days.

(21) Appl. No.: 13/700,450

(22) PCT Filed: May 24, 2011

(86) PCT No.: PCT/EP2011/058399
§ 371 (c)(1),
(2), (4) Date: Nov. 28, 2012

(87) PCT Pub. No.: WO2011/154242
PCT Pub. Date: Dec. 15, 2011

(65) Prior Publication Data
US 2013/0085637 A1  Apr. 4, 2013

(30) Foreign Application Priority Data

Jun. 9, 2010 (DE) .......................... 10 2010 023 162

(51) Int. Cl.
*B60W 30/06* (2006.01)
*G01C 21/00* (2006.01)
*B60W 50/00* (2006.01)
*B62D 15/02* (2006.01)
*G05D 1/00* (2006.01)
*B60W 50/08* (2012.01)

(52) U.S. Cl.
CPC ............... *G01C 21/00* (2013.01); *B60W 30/06* (2013.01); *B60W 50/0098* (2013.01); *B62D 15/027* (2013.01); *B62D 15/0285* (2013.01); *G05D 1/00* (2013.01); *B60W 50/082* (2013.01); *B60W 2050/0063* (2013.01); *B60W 2050/0089* (2013.01)

(58) Field of Classification Search
CPC ............. B62D 15/027; B62D 15/0275; B62D 15/028; B62D 15/02; B60R 1/00; B60R 2300/302; B60R 2300/305; B60R 2300/607; B60R 2300/806; B60R 2300/8086; B60W 50/14; G06T 17/05
USPC ................. 701/28, 201, 212; 340/438, 932.2; 342/36
See application file for complete search history.

(56) References Cited

U.S. PATENT DOCUMENTS

| 2002/0041239 A1* | 4/2002 | Shimizu et al. ............ 340/932.2 |
| 2005/0035898 A1* | 2/2005 | Shiomi et al. ................ 342/36 |
| 2007/0299572 A1* | 12/2007 | Okamoto et al. .............. 701/28 |
| 2008/0084287 A1* | 4/2008 | Sturm ........................ 340/438 |
| 2008/0174452 A1* | 7/2008 | Yamamoto et al. ........ 340/932.2 |
| 2009/0171563 A1* | 7/2009 | Morimoto et al. ............ 701/201 |
| 2009/0322565 A1* | 12/2009 | Faber ........................ 340/932.2 |
| 2011/0166783 A1* | 7/2011 | Ren et al. .................... 701/212 |

FOREIGN PATENT DOCUMENTS

| DE | 196 35 892 A1 | 3/1997 |
| DE | 10 2004 007 850 A1 | 9/2004 |
| EP | 1 249 379 A2 | 10/2002 |
| EP | 2 008 915 A2 | 12/2008 |
| JP | 2006-321291 A | 11/2006 |
| JP | 2009-286211 A | 12/2009 |
| WO | 2006/092730 A1 | 9/2006 |

OTHER PUBLICATIONS

International Search Report issued in PCT/EP2011/058399 mailed Jul. 20, 2011 (4 pages).

* cited by examiner

*Primary Examiner* — James Trammell
*Assistant Examiner* — Sanjeev Malhotra
(74) *Attorney, Agent, or Firm* — Osha Liang LLP (57) ABSTRACT

The invention relates to a method for assisting a driver of a motor vehicle (1) when parking in a parking space (19), in particular in a garage (18), using a driver assistance device (2) of the motor vehicle (1), wherein:

- in a learning mode of the driver assistance device (2), reference data related to the surrounding area (22) of the parking space (19) are recorded and stored using a sensor device (7) of the driver assistance device (2), while the motor vehicle (1) is parked in the parking space (19) while controlled by the driver,
- a reference target position (27), which is reached by the motor vehicle (1) in the learning mode, is recorded by the driver assistance device (2) and data with information about this reference target position (27) are stored,
- in a subsequent operating mode of the driver assistance device (2) different from the learning mode, sensor data are detected by the sensor device (7) and compared with the reference data, wherein depending on this comparison the surrounding area (22) of the parking space (19) is identified using the detected sensor data and thereby a current position (28, 33) of the motor vehicle (1) relative to the reference target position (27) is determined and
- depending on the current position (28, 33) of the motor vehicle (1) relative to the reference target position (27), a parking route (29, 32, 36) is determined by the driver assistance device (2), along which the motor vehicle (1) is parked in the parking space (19) from the current position (28, 33).

The invention also relates to a driver assistance device (2) for carrying out the method.

15 Claims, 3 Drawing Sheets

METHOD FOR ASSISTING A DRIVER OF A MOTOR VEHICLE WHEN PARKING IN A PARKING SPACE, DRIVER ASSISTANCE DEVICE AND A MOTOR VEHICLE

The invention relates to a method for assisting a driver of a motor vehicle when parking in a parking space, especially in a garage, using a driver assistance device of the motor vehicle. The invention also relates to a driver assistance device, such as on a motor vehicle with such a driver assistance device.

Interest in the present case is particularly directed to assisting the driver when parking in such parking spaces, in which the motor vehicle is often parked—for example daily. This can be, for example, a garage or a parking space. A solution is particularly sought with which a motor vehicle can be parked in such a parking space by the driver assistance device fully autonomously—driver independently—from any starting position.

From document EP 1 249 379 B1 a method is known that is used for parking a motor vehicle in a parking space. The motor vehicle is first—under driver control—brought into a starting position close to the desired target position. The surroundings of the motor vehicle are continuously detected and the current position of the vehicle relative to the parking space is determined. Using the determined relative position of the motor vehicle relative to the parking space, as well as using the detected surroundings data, control information is then determined for the parking process. The driver can then initiate the actual parking process by activating an operating device. Following initiation of the parking process by the driver, control commands are output to the drive train, the brake system and also the steering of the motor vehicle, so that the motor vehicle is parked in the parking space independently of the driver.

The document EP 1 858 744 B1 discloses a method for carrying out a parking process of a motor vehicle. A route is recorded during the movement of the vehicle from a starting point to an end point. Thereafter, the motor vehicle is automatically moved back along the recorded route from the end point to the starting point. In the subject matter according to document EP 1 858 744 B1, the motor vehicle can thus be autonomously moved along a previously recorded route. This is above all advantageous if the vehicle is to be parked in a parking space with no suitable space for entering or exiting. The driver can first position the vehicle at a desired position in the parking space, drive out of the parking space and then leave the vehicle. The vehicle is now automatically moved along the recorded route back to the desired parking position. Such automatic parking presupposes, however, that the motor vehicle is on the previously recorded route, i.e. at the starting point or at the target point. Automatic parking from any starting position is thus not possible.

Document DE 10 2004 007 850 A1 discloses a method for automatically approaching bus stops for city buses. A sensor device detects data relating to the surroundings of the bus. A stop is identified using certain reference features and associated data are called up from a database for the identified stop, namely, for example, the geometry of the bus stop.

It is the object of the present invention to provide a solution whereby a driver of a motor vehicle can be particularly reliably assisted when parking in a frequently approached parking space—especially in his own garage—starting from any starting position.

This object is achieved according to the invention by a method with features according to claim 1, and also by a driver assistance device with the features according to claim 15. Advantageous embodiments of the invention are the subject of the secondary claims and the description.

In a method according to the invention, a driver of a motor vehicle is assisted when parking in a parking space—in particular in a parking space that is approached daily, preferably in a garage—using a driver assistance device of the motor vehicle. The driver assistance device has a learning mode and an operating mode. In the learning mode, reference data relating to a region around the parking space are detected using a sensor device of the driver assistance device and stored, while the motor vehicle is being parked in the parking space under driver control. In the learning mode, moreover, a reference target position that is reached by the motor vehicle in the learning mode is recorded by the driver assistance device. Data with information relating to the reference target position—especially in relation to the surrounding area—are stored. In the subsequent operating mode, sensor data are detected by the sensor device and compared with the reference data. Depending on this comparison, the surrounding area of the parking space is recognized or identified using the detected sensor data, and a current position of the motor vehicle relative to the reference target position is determined. Depending on the current position of the motor vehicle relative to the reference target position, a parking route is determined by the driver assistance device, along which the motor vehicle is parked in the parking space from the current position.

The invention is based on multiple findings: The invention is first based on the knowledge that in the prior art—namely in the subject matter according to document EP 1 858 744 B1—the process of parking can only be initiated from a starting position that lies on the previously recorded path. The invention also builds on the knowledge that the method according to document EP 1 858 744 B1 can thus not be used for a frequently approached parking space—namely especially a garage, because the driver always stops the motor vehicle at a different starting position when approaching the garage. The invention is also based on the knowledge that even if in the prior art—as in the subject matter according to document EP 1 249 379 B1—the parking route is always recalculated starting from any starting position, reliable parking cannot always be guaranteed, e.g. if the parking space cannot be detected by the sensor device because of obstructions located in the surroundings. The invention is finally based on the knowledge that the disadvantages of the prior art can therefore be overcome, that on the one hand in the learning mode both reference data relating to the surrounding area of the parking space and data with information about the reference target position relative to the surrounding area are stored, and on the other hand in the operating mode the surrounding area of the parking space is identified and in each case a parking route for reaching the parking space is determined depending on the current position of the motor vehicle relative to the reference target position. In this way it is possible to determine a parking route leading to the target from any starting position, even if the parking space cannot currently be detected by the sensor device. That is to say that the driver assistance device can orient itself relative to the recorded surrounding area and thereby determine the current position of the motor vehicle relative to the reference target position. The invention thus has the advantage that on the one hand the parking route for reaching the parking space starting from any starting position, at which the motor vehicle is stopped by the driver, can be determined and on the other hand the parking process can even be initiated if the parking space itself cannot currently be detected by the sensor device.

The driver assistance device thus has two different operating modes, namely the learning mode on the one hand and the operating mode on the other hand. It can be provided that the driver assistance device can be changed into the learning mode because of an input made by the driver at an input device—for example an operating device and/or an acoustic input device. The operating mode can in principle also be initiated because of an input by the driver. However, it has proved particularly advantageous if the operating mode is started automatically or independently by the driver assistance device and thus independently of the driver. The driver assistance device can, for example, continuously compare the current detected sensor data with the reference data and automatically recognize the surrounding area using the current detected sensor data. Following identification of the surrounding area, the driver assistance device can output information to the driver, with which the driver is informed about the possibility of parking in the parking space. The driver can then confirm and initiate or not initiate the actual process of parking using an input device.

In one embodiment, a reference starting position, from which the motor vehicle is moved in learning mode, is recorded by the driver assistance device in learning mode. Data with information about the reference starting position relative to the reference target position or relative to the surrounding area are stored in the driver assistance device. The driver assistance device can then determine the parking route in operating mode, also taking into account the reference starting position. The driver assistance device can thus orient itself to the reference starting position from which the motor vehicle has already been parked in the parking space once by the driver, namely in learning mode.

It has proved to be particularly advantageous, if, starting from the reference starting position in the learning mode, a reference route along which the motor vehicle is driven into the parking space in learning mode is recorded by the driver assistance device. The driver assistance device can then store data with information about the course of the reference route, and in operating mode it can determine the parking route, also taking into account the course of the reference route. This embodiment has the advantage that the driver assistance device can orientate itself to the already travelled and known reference route when determining the new parking route. The driver assistance device can, for example, take over at least one region of the reference route for the new parking route, so that the computing power when determining the necessary parking route is reduced to a minimum. The course of the reference route also provides additional information about the possible route along which the motor vehicle can be parked in the parking space without problems. Taking account of the already recorded reference route, the new parking route can thus be determined particularly simply and expediently.

In operating mode, for example, a parking route can be determined that coincides with the reference route at least in an end region. The motor vehicle is then guided along the parking route to the reference route. With this embodiment, the driver assistance device therefore only has to recalculate an initial region of the parking route, and the end region of the stored reference route is used. In this way, a particularly reliable and expedient parking route can be determined that is based upon the known and—because it was only travelled by the driver—reliable reference route. The computing power required for the new parking route is thus reduced to a minimum.

It is preferable to determine a parking route, which increasingly approaches the reference route steadily or continuously, until it coincides with the reference route. In this way, the parking process can be carried out in a particularly user-friendly manner; the determined parking route provides comfortable and steady, as well as visually pleasing, parking, i.e. without an erratic course of the determined parking route. A steady approach of the determined parking route to the reference route can, for example, be such that after each distance of e.g. 1 m travelled by the motor vehicle, a distance between the determined parking route and the reference route is continuously reduced by a distance from a range of values of 10 cm to 100 cm. After each meter of the distance covered, the distance between the parking route and the reference route can thus be steadily reduced by a distance of 10 cm or 20 cm or 30 cm or 40 cm or 50 cm or 60 cm or 70 cm or 80 cm or 90 cm or 100 cm.

In the operating mode, for example, a parking route can be determined that adjoins the reference route at a point or which meets the reference route at a point at which the vehicle's longitudinal axis—if the motor vehicle is moving along the determined parking route—encloses an angle smaller than a predetermined angle value with the vehicle's longitudinal axis—if the motor vehicle is moving along the reference route. The angle value can, for example, be in a range of values of 1° to 20°; its value can for example be 1° or 3° or 6° or 9° or 12° or 15° or 17° or 20°. This ensures that the determined parking route approaches the reference route quasi asymptotically until it reaches the reference route and coincides with it.

Generally speaking, the determined parking route approaches the reference route asymptotically until it coincides with the reference route at a certain point.

When determining the parking route, the driver assistance device can also take the reference data into account, namely the respective relative positions of reference objects relative to each other and/or relative to the reference starting position or the reference route. The driver assistance device can also take into account the current detected sensor data. The driver assistance device can then determine a parking route that provides collision-free parking in the parking space.

In an alternative to the embodiment described above—in which the reference route is recorded and the parking route is calculated taking into account the reference route—it can be provided that the parking route is entirely determined anew depending only on the current position of the motor vehicle relative to the reference target position and/or the reference starting position and taking into account the reference data relating to the surrounding area and/or taking into account the sensor data. In this embodiment, the parking route is calculated from the start each time independently of a reference route. This embodiment has the advantage that on the one hand no reference route has to be recorded and on the other hand the driver assistance device can calculate a parking route that is optimal according to specific criteria each time, without it being restricted to a reference route travelled by the driver himself. This embodiment can, for example, be implemented in such a procedure: The driver assistance device assists the driver when parking in his own garage. Reference data relating to a surrounding area of the garage are stored in the driver assistance device. The reference data are detected by a camera of the sensor device. The reference data are thus image data or data derived from image data of the camera or data generated by image processing. The reference data contain information about reference features of the surrounding area of the garage, namely, for example, about the geometric shape of reference objects located in the surrounding area, about the respective relative positions of the reference objects relative to each other and about the colouring of the reference objects. The driver now stops with the motor vehicle in the vicinity of the garage, so that the garage is outside a detection range of the sensor device. The camera of the sensor device now records sensor data about the surroundings of the motor vehicle. The driver assistance device now compares the sensor data with the stored reference data. The driver assistance device can, for example, subject the current detected sensor data to feature recognition or pattern recognition with respect to the reference features contained in the reference data. This enables the driver assistance device to recognize the surrounding area of the garage. The driver assistance device determines the current position of the motor vehicle in the surrounding area of the garage using the sensor data and can also determine the relative position of the motor vehicle relative to the reference starting position, from which the motor vehicle was parked in the learning mode, and to the reference target position. Depending on this current position of the motor vehicle relative to the reference starting position and/or relative to the reference target position, as well as taking into account the reference data and/or the sensor data—namely taking into account the respective positions of objects in the surrounding area—the driver assistance device calculates a new parking route, along which the motor vehicle can be parked in the garage. If a collision-free parking route can be calculated, then the driver assistance device outputs to the driver information relating to the fact that the process of parking can be started. The driver can now initiate or not initiate the parking process, for example by activating an operating device. If the parking process is initiated, then the driver assistance device intervenes in the drive train and in a steering device of the motor vehicle and carries out the parking process automatically or autonomously.

As already mentioned, for recognition of the surrounding area, at least one reference feature of the surrounding area specified in the reference data can be recognized using the sensor data. Thus reference features of the surrounding area can be specified in the reference data. The current detected sensor data can then be subjected by the driver assistance device to feature recognition in relation to the stored reference features. This can take place, for example, whereby a predetermined number of reference features is recognized for identification of the surrounding area. This enables the surrounding area of the parking space to be identified by the driver assistance device reliably or with a high probability and with a suitably low error rate.

In principle, the surrounding area can also be recognized using reference features of the parking space or reference features of the objects immediately bounding the parking space. However, the driver assistance device can then recognize the surrounding area using reference features, even if the parking space or the objects bounding the parking space currently are not or cannot be recognized by the sensor device. Thus the driver assistance device can recognize the surrounding area of the parking space and thus also directly recognize the parking space itself by only using reference features of reference objects, which are different objects from the objects immediately bounding the parking space or are separate objects. The driver can thus stop with his motor vehicle at practically any position, in which the sensor device can detect the reference objects located in the surrounding area. The sensor device does not have to be able to detect the parking space itself or the objects bounding the parking space in doing this.

The reference features, using which the surrounding area of the parking space is recognized, can be at least one of the following reference features, for example:

a relative position of a reference object relative to another reference object and/or relative to the parking space and/or     a geometric shape of at least one reference object and/or     a colouration of at least one reference object.

That is, it is possible to uniquely identify the surrounding area of the parking space using such reference features.

For detecting the reference data and/or the sensor data, the controller can comprise, for example, at least one chamber and/or at least one ultrasound sensor. The reference data and/or the sensor data can, however, additionally or alternatively also be detected using a radar device and/or a lidar device. Whereas using an ultrasound sensor in each case distances of reference objects from the motor vehicle and from each other can be detected particularly accurately, using image data of a camera further reference features can also be identified, such as, for example, the geometric shape of reference objects or the colouration.

The sensor device can also detect the sensor data during the parking process—namely in the operating mode. Using the sensor data, distances of the motor vehicle from detected objects can then be determined, and the previously determined parking route can then be corrected where appropriate. The parking route can, for example, be corrected following the fulfilment of a predetermined correction criterion related to the distances. The originally determined parking route can thus be corrected depending on at least one of the detected distances. If the correction criterion is fulfilled, then the parking route is re-planned, i.e. preferably also depending on the detected distances. This embodiment is based on the fact that during the parking process, new unknown objects can enter the surrounding area of the parking space or the surroundings of the motor vehicle. The potentially conducted correction of the parking route thus enables collision-free parking of the motor vehicle in the parking space. That is, any objects entering the surrounding area can be detected and accordingly avoided by the motor vehicle. The predetermined correction criterion can, for example, include the condition that a recorded distance is less than a prescribed limit value. This limit value can, for example, be in a range of values of 10 cm to 50 cm; it can be 30 cm for example.

The reference data are preferably continually or continuously recorded during the parking process, so that the driver assistance device continually checks whether new objects enter the surroundings of the motor vehicle.

In principle, the driver assistance device can only assist the driver semi-autonomously when parking in the parking space. This means that the driver assistance device only outputs visual and/or acoustic information to the driver, relating to how he has to steer the motor vehicle in order to drive the motor vehicle along the determined parking route into the parking space. However, it has proved to be particularly advantageous, if the driver assistance device is a fully autonomous or automatic driver assistance device. Then the driver assistance device can steer the motor vehicle automatically by outputting suitable control signals to a steering device, so that it is parked in the parking space. In addition, the driver assistance device can also intervene in the drive train and accelerate or brake the motor vehicle.

A driver assistance device according to the invention is designed for assisting a driver of a motor vehicle when parking in a parking space, especially in a garage. The driver assistance device can detect and store reference data relating to a surrounding area of the parking space in a learning mode, while the motor vehicle is being parked in the parking space under driver control. The driver assistance device can, moreover, record a reference target position that is reached by the motor vehicle in the learning mode and can store data with information about the reference target position—in particular relative to the surrounding area. In a subsequent operating mode differing from the learning mode, the driver assistance device records sensor data and compares it with the reference data. Depending on this comparison, the driver assistance device can recognize the surrounding area of the parking space using the recorded sensor data and can determine a current position of the motor vehicle relative to the reference target position therefrom. Depending on the current position of the motor vehicle relative to the reference target position, the driver assistance device determines a parking route, along which the motor vehicle will be parked in the parking space from the current position.

The invention also relates to a motor vehicle, which comprises a driver assistance device according to the invention.

The preferred embodiments proposed in relation to the method according to the invention and their advantages apply correspondingly to the driver assistance device according to the invention, and also to the motor vehicle according to the invention.

Further features of the invention will become apparent from the claims, the figures and the description of the figures. All the features and combinations of features mentioned above in the description and in the figure descriptions below and/or the features and combinations of features indicated in the figures alone are not only able to be used in the respectively specified combination, but also in other combinations or even by themselves.

The invention will now be explained in detail using individual preferred example embodiments, and also with reference to the accompanying drawings.

Figure 1:
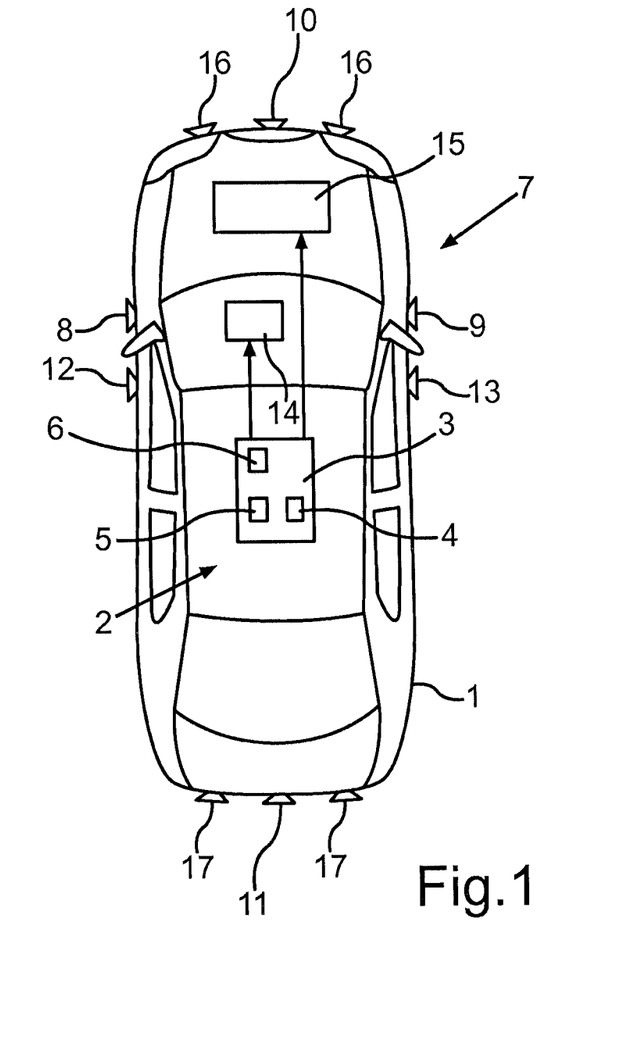
FIG. 1 in a schematic illustration a motor vehicle with a driver assistance device according to an embodiment of the invention.

A motor vehicle 1 shown in FIG. 1 in a schematic illustration is a passenger car in the example embodiment. The motor vehicle 1 comprises a driver assistance device 2, which is designed for assisting a driver of the motor vehicle 1 when parking in his own garage or in his own parking space. Generally speaking, the driver assistance device 2 is used for assisting the driver when parking in a frequently—for example daily—approached parking space.

The driver assistance device 2 comprises a controller 3, which can comprise a memory 4, a digital signal processor 5 and a microcontroller 6. The driver assistance device 2 contains, moreover, a sensor device 7, whose sensors are mounted on the outer surface of the motor vehicle 1. The sensor device 7 comprises two ultrasound sensors 8, 9, each attached to a side of the motor vehicle 1, and also a plurality of cameras 10, 11, 12, 13. In the example embodiment, the number and the arrangement of the cameras 10, 11, 12, 13 are only illustrated as examples. That is, one camera 10 is mounted on the front bumper of the motor vehicle 1; one camera 11 is mounted on the rear bumper; one camera 12 is mounted on the left side or on the left exterior mirror, while one camera 13 is mounted on the right side or on the right exterior mirror. The cameras 10, 11, 12, 13 can have relatively wide recording angles; they can be fisheye cameras. Using the cameras 10, 11, 12 13, the entire surroundings around the motor vehicle 1 can be recorded.

Ultrasound sensors 16, 17 can also be mounted on the front and rear bumpers, in order to detect the distances of objects in the surroundings of the motor vehicle 1 from the motor vehicle 1.

The sensor device 7, i.e. both the ultrasound sensors 8, 9, 16, 17 and the cameras 10, 11, 12, 13, record data about the surroundings of the motor vehicle 1 and transfer the recorded data to the controller 3. This can process the recorded data and then assist the driver when parking depending on a result of the data processing.

In the motor vehicle 1, moreover, there is a visual display device 14, with which visual information can be displayed to the driver. The display device 14 is controlled by the controller 3. The controller 3 can also output control signals to a steering device 15 of the motor vehicle 1, in order to steer the steerable wheels of the motor vehicle 1.

Figure 2:
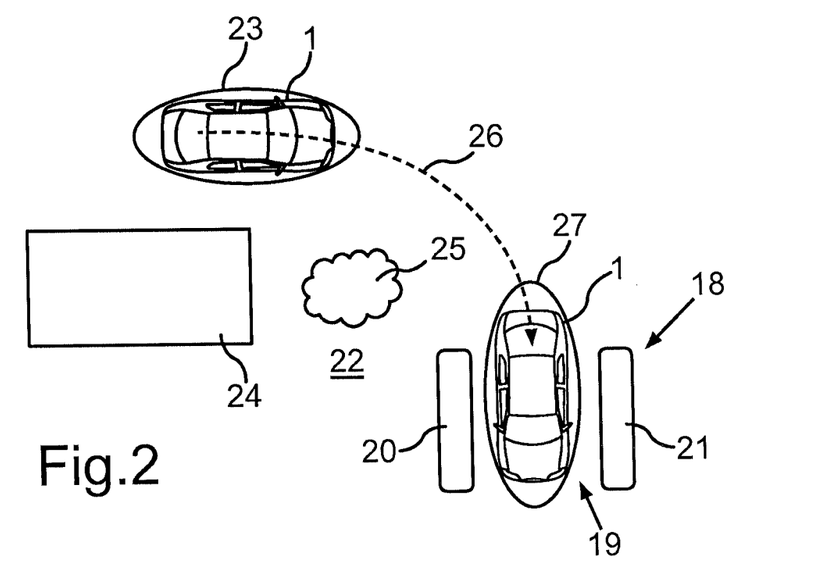
FIG. 2 in a schematic illustration a plan view of a parking scenario, whereby the operation of the driver assistance device is explained in detail in a learning mode.
Figure 3:
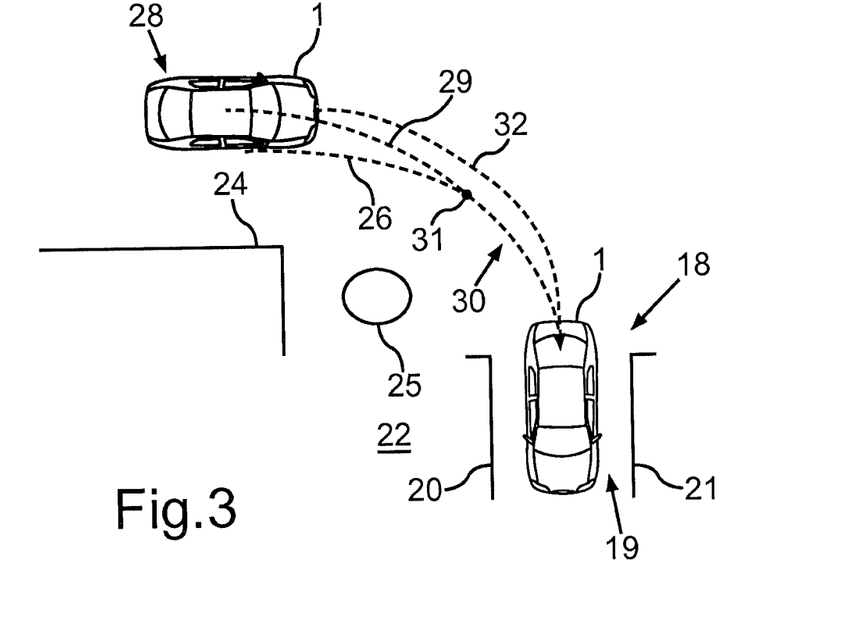
FIG. 3 in a schematic illustration a plan view of the scenario according to FIG. 2, whereby the operation of the driver assistance device is explained in detail in an operating mode.

Referring now to FIGS. 2 and 3, a method according to one embodiment of the invention is now explained in detail. The method is used for assisting the driver when parking the motor vehicle 1 in a garage 18 or a parking space. The garage 18 contains a parking space 19, which in the present case is immediately delimited by side walls 20, 21. The motor vehicle 1 is intended to be parked in the parking space 19. The method is, however, not limited to a garage 18; the driver assistance device 2 can also assist the driver when parking in other parking spaces, namely in particular in such parking spaces that are immediately laterally delimited by other objects—such as motor vehicles—or by road markings or similar.

The driver assistance device 2 is first changed into a learning mode. This can, for example, take place as a result of an input by the driver, i.e. by operating a control device, for example. In the learning mode a surrounding area 22 of the parking space 19 is learned by the driver assistance device 2. The surrounding area 22 of the parking space 19 also includes the lateral boundaries of the parking space 19, i.e. in the present case the side walls 20, 21. In the learning mode the motor vehicle 1 is manually parked by the driver in the garage 18 once. While doing so, the sensor device 7 records reference data about the surrounding area 22 starting from a reference starting position 23, from which the motor vehicle 1 is moved in the learning mode. These reference data are stored in the driver assistance device 2, namely in the memory 4 of the controller 3.

With respect to the recording of the surrounding area 22, in principle very different embodiments are usefully possible. The sensor device 7 can record the surrounding area 22 using the cameras 10, 11, 12, 13. Additionally or alternatively, the surrounding area 22 can also be recorded by the ultrasound sensors 8, 9, 16, 17.

The driver assistance device 2 first records the reference starting position 23 in the surrounding area 22. The sensor device 7 also records reference objects that are located in the surrounding area 22, namely a first reference object 24 and also a second reference object 25. In the example embodiment the first reference object 24 is, for example, a building, whereas the second reference object 25 is a tree. The sensor device 7 also records the reference data during the parking process in the learning mode. The reference data are also continuously detected by the sensor device 7 and placed in the memory 4, so that there is a complete picture of the surrounding area 22.

In learning mode the motor vehicle 1 is parked under driver control along a reference route 26, i.e. along a path determined by the driver himself. Two different embodiments are now provided: The driver assistance device 2 can record the course of the reference route 26, and information about the course or the shape of the reference route 26 can be stored in the memory 4. In this embodiment the driver assistance device 2 thus records both the course of the reference route 26 and also the reference starting position 23 relative to the reference objects 20, 21, 24, 25 and a reference target position 27 relative to the reference objects 20, 21, 24, 25, which is reached by the motor vehicle 1 in the garage 18. In an alternative embodiment the driver assistance device 2 can, without recording the course or the shape of the reference route 26, only record the reference starting position 23 relative to the reference objects 20, 21, 24, 25 and the reference target position 27 relative to the reference objects 20, 21, 24, 25 or relative to the reference starting position 23.

As mentioned above, the sensor device 7 detects the reference data continuously during the entire parking process in learning mode. If the motor vehicle 1 approaches the garage 18 in learning mode, then the side walls 20, 21 and other objects forming the garage 18 enter the detection region of the sensor device 7. These objects—namely the side walls 20, 21 and similar—are also recorded by the driver assistance device 2 and interpreted as reference objects.

The learning mode of the driver assistance device 2 can also, for example, be terminated as a result of an input which the driver carries out at a control device. For example, the driver can operate a button to turn off the learning mode.

In learning mode the driver assistance device 2 thus records reference data containing information about the surrounding area 22 of the parking space 19. The reference data in total virtually form a digital map of the surrounding area 22. In the reference data, reference features of the surrounding area 22 are described. These reference features can, for example, include the relative position of the reference objects 20, 21, 24, 25 relative to each other, and also the respective geometric shape of the reference objects 20, 21, 24, 25 and the respective colouration of the reference objects 20, 21, 24, 25. The degree of abstraction of the representation of the reference objects 20, 21, 24, 25 in the reference data can also be different. For example, the reference data may only contain information about simplified contours of the reference objects 20, 21, 24, 25, as shown schematically in FIG. 3.

The driver assistance device 2 assists the driver when parking in the garage 18 in an operating mode. The operating mode can be activated as a result of an input on the part of the driver in one embodiment, as in the learning mode. Alternatively, the operating mode can also be activated automatically, and the driver assistance device 2 can continuously check, using current detected sensor data of the sensor device 7, whether the current surroundings of the motor vehicle 1 correspond to the surrounding area 22. The operating mode is explained in detail below with reference to FIG. 3.

The driver stops with the motor vehicle 1 in a starting position 28, in order to allow the motor vehicle 1 to be parked in the garage 18, namely using the driver assistance device 2. The sensor device 7 now detects sensor data relating to the surroundings of the motor vehicle 1. These sensor data are now subjected by the controller 3 to feature recognition or pattern recognition with regard to each stored reference feature, and the controller 3 checks whether the current surroundings of the motor vehicle 1 can be identified as the surrounding area 22 of the parking space 19 or not. Because in the example embodiment according to FIG. 3 the motor vehicle 1 is immediately in the vicinity of the reference objects 24, 25, the controller 3 determines, using the stored reference features of the surrounding area 22, that the surroundings of the motor vehicle 1 are the surrounding area 22 of the parking space 19. Thus the controller 3 then records the reference objects 24, 25, even if the parking space 19 itself cannot be detected by the sensor device 7.

Starting from the current starting position 28 of the motor vehicle 1, which is different from the reference starting position 23, the controller 3 calculates a parking route, along which the motor vehicle 1 can be parked in the garage. Here, two essentially different embodiments are provided, namely depending on whether the course of the reference route 26 is stored in the controller 3 or not.

If the course of the reference route 26 is stored in the controller 3, then the calculation of a new parking route 29 is based on the following information: the reference starting position 23, the reference target position 27, the course of the reference route 26, the current starting position 28 of the motor vehicle 1 relative to the reference route 26 and the current recorded sensor data. In this case the controller 3 calculates the parking route 29 taking into account the reference route 26. That is, it can be seen from this that a route previously travelled by the driver himself—the reference route 26—is a reliable and expedient route. That is, a parking route 29 is determined for the parking process by a controller 3, which coincides with the reference route 26 in an end region 30—in the example embodiment for instance in the second half. The motor vehicle 1 is thus guided to the original reference route 26, i.e. so that the current parking route 29 steadily and continuously approaches the reference route 26. An erratic course of the parking route 29 is thus prevented; the new parking route 29 approaches the reference route 26 asymptotically and meets the reference route 26 at a point 31. The point 31 is thus determined in such a way that the vehicle's longitudinal axis—when the motor vehicle 1 is moving along the parking route 29—encloses an angle with the vehicle's longitudinal axis—when the motor vehicle 1 is moving along the reference route 26—which is less than 10°, for example. In this way it is possible to provide a comfortable parking process.

By contrast, if there is no information about the course of the reference route 26 stored in the controller 3, the controller 3 calculates a parking route 32 completely independently of the reference route 26. The parking route 32 is thus calculated entirely from the start. The calculation of the parking route 32 is based on the following information: the reference starting position 23 relative to the reference objects 20, 21, 24, 25, the reference target position 27 relative to the reference starting position 23, the current starting position 28 of the motor vehicle 1 relative to the reference starting position 23 or the reference target position 27 and the current recorded sensor data. Thus in this embodiment the controller 3 can orientate itself to the reference starting position 23 and the reference target position 27. The controller 3 calculates a parking route 32 that leads the motor vehicle 1 into the garage 18 without collisions.

For both parking route 29 and parking route 32, the controller 3 continuously monitors the surroundings of the motor vehicle 1. The controller 3 continuously checks whether other objects enter the surroundings of the motor vehicle 1. If the distance of a detected object from the motor vehicle 1 is below a predetermined limit—for example 30 cm—, then the controller 3 can correct the determined parking route 29, 32. This is carried out in such a way that the object is avoided by the motor vehicle 1 at a safe distance. Alternatively, the motor vehicle 1 can also be braked, and the controller 3 can wait until the object has disappeared from the surroundings of the motor vehicle 1.

When approaching the garage 18, lateral distances of the motor vehicle 1 from the side walls 20, 21 are also taken into account by the controller 3, being measured by the lateral ultrasound sensors 8, 9. Starting from a position of the motor vehicle 1 in which the lateral ultrasound sensors 8, 9 are already located within the garage 18, i.e. the distances to the side walls 20, 21 can be detected, the motor vehicle 1 can be driven in a controlled manner to the target position in the garage 18. I.e. this control can be carried out so that the lateral distances of the motor vehicle 1 from the side walls 20, 21 are equal. If there are additional objects in the garage 18, then this control is carried out, for example, in such a way that the lateral distances of the motor vehicle 1 to the respective closest object in the garage—whether this object is one of the side walls 20, 21 or another object—are equal.

The parking process, as carried out using the driver assistance device 2, can take place entirely autonomously. This means that the controller 3 steers the steerable wheels of the motor vehicle 1 depending on the calculated parking route 29, 32 in a suitable manner, so that the motor vehicle 1 is parked in the garage 18 along the parking route 29, 32. The controller 3 may intervene in the drive train of the motor vehicle 1 in order to accelerate or decelerate the motor vehicle 1 to walking pace. It can also be provided that the driver assistance device 2 contains a remote controller, with which the driver can send control commands to the controller 3 from outside the motor vehicle 1. The controller 3 can then initiate or interrupt the parking process 1 based on such control commands.

Figure 4:
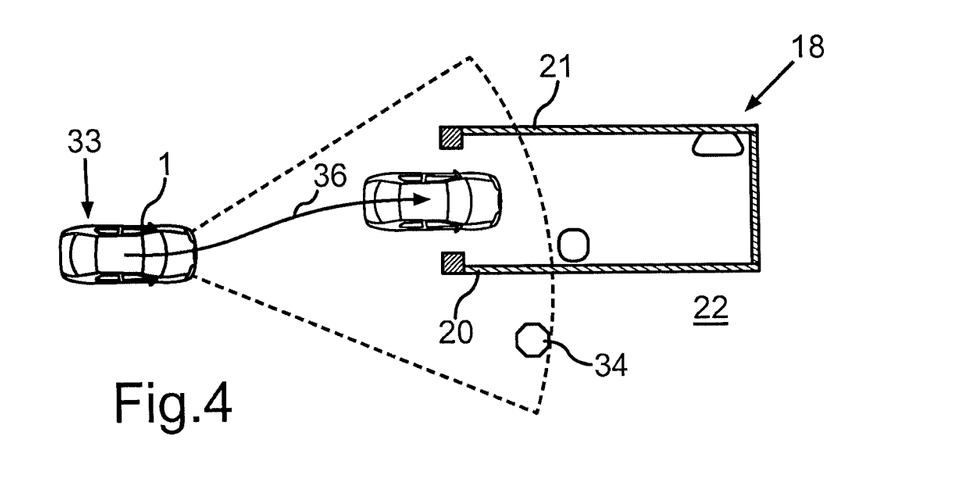
FIG. 4 in a schematic illustration a plan view of a parking scenario, whereby a method according to another embodiment of the invention is explained in detail.
Figure 5:
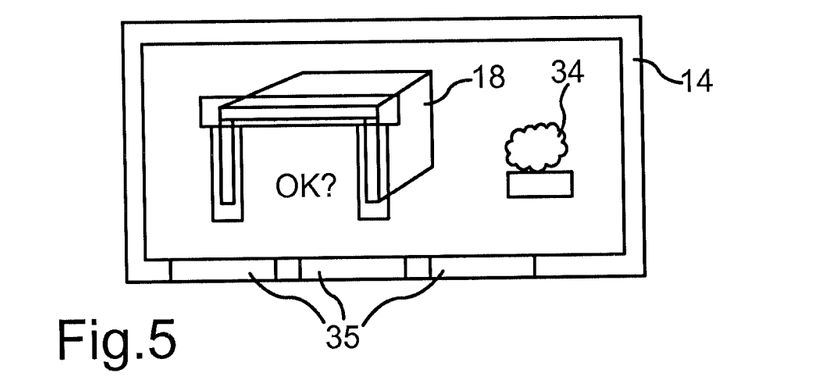
FIG. 5 in a schematic illustration a display on a visual display screen of the driver assistance device.

Referring now to FIG. 4, another example will now be explained in detail. The driver stops with his motor vehicle 1 in a different starting position 33, in which the motor vehicle 1 is located directly opposite the garage 18. The sensor device 7 now detects the front of the garage 18 and a reference object 34—for example a shrub or similar—being located close to the garage 18. The sensor device 7 also detects the side walls 20, 21 of the garage 18. The garage 18 is thus within the detection region of the sensor device 7. The controller 3 identifies the surrounding area 22 of the garage 18 using sensor data, namely using reference features of the side walls 20, 21 and also using the reference object 34. The controller 3 now controls the display device 14 so that a picture is displayed on the display device 14, as illustrated as an example in FIG. 5. The garage 18 and the reference object 34 are thus shown on the display device 14 in a schematic illustration. The driver is thus informed that the garage 18 has been identified and that automatic parking in the garage 18 is possible. The driver can now initiate the automatic parking process, namely by operating a control device 35. The driver can thus confirm the parking process or not.

If the process is initiated by the driver, then the motor vehicle 1 is parked in the garage 18 autonomously, i.e. along a parking route 36 determined by the controller 3 in the manner described in detail above.

Figure 6:
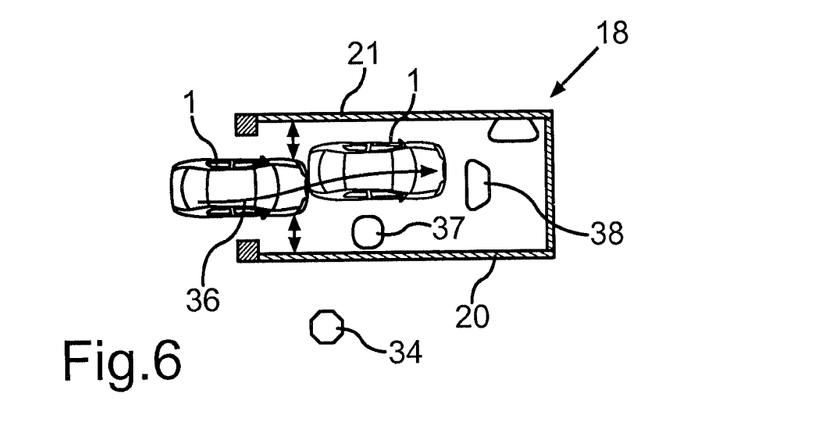
FIG. 6 in a schematic illustration a plan view of the parking scenario according to FIG. 4, whereby the motor vehicle is already partly in a garage.

As already described, the movement of the motor vehicle 1 into the garage 18 can be controlled by the controller 3—if the side walls 20, 21 are within the respective detection region of the lateral ultrasound sensors 8, 9. And this control preferably takes place in such a way that the lateral distances of the motor vehicle 1 from the respective closest objects are equal. Here the controller 3 can also take into account the image data acquired by the cameras 10, 11, 12, 13 in order to determine the positions of recorded objects in the garage. In the example embodiment according to FIG. 6, there is a waste bin 37 next to the side wall 20, which can only be detected by the sensor device 7 if the motor vehicle 1 is partially located within the garage 18. The parking route 36 can then be modified so that the motor vehicle 1 is guided to a final position in the garage 18, in which the distance of the motor vehicle 1 from the side wall 21 equals the distance to the waste bin 37. The motor vehicle 1 is also stopped at a safe distance from another object 38 located in the garage 18.

The invention claimed is:

1. A method for assisting a driver of a motor vehicle when parking in a parking space in a garage, using a driver assistance device of the motor vehicle, the method comprising:
   recording and storing, in a learning mode of the driver assistance device, reference data about a surrounding area of the parking space using a sensor device of the driver assistance device, while the motor vehicle is parked in the parking space under driver control;
   recording a reference target position, which is reached by the motor vehicle in learning mode, by the driver assistance device and storing data with information about the reference target position;
   in a subsequent operating mode different from the learning mode, recording, by the driver assistance device, sensor data via the sensor device and comparing the sensor data with the reference data, wherein depending on a result of the comparison, identifying the surrounding area of the parking space using the recorded sensor data, and determining a current position of the motor vehicle relative to the reference target position; and
   depending on the current position of the motor vehicle relative to the reference target position, determining an automated parking route by the driver assistance device, along which the motor vehicle is parked automatically in the parking space from the current position without driver control, wherein the driver retains ability to initiate or interrupt the automated parking route using control commands.

2. The method according to claim 1, wherein, in the learning mode a reference starting position, from which the motor vehicle is moved in the learning mode, is also recorded by the driver assistance device and data with information about the reference starting position relative to the reference target position are stored, wherein in the operating mode the parking route is also determined taking into account the reference starting position relative to the reference target position.

3. The method according to claim 1, wherein in the learning mode a reference route, along which the motor vehicle is parked in the parking space in the learning mode, is recorded by the driver assistance device and data with information about a course of the reference route is stored, wherein the parking route is determined in the operating mode, also taking into account the course of the reference route.

4. The method according to claim 3, wherein in the operating mode a parking route is determined, which coincides with the reference route at least in an end region, so that the motor vehicle is guided to the reference route along the parking route.

5. The method according to claim 4, wherein in the operating mode a parking route is determined, which steadily increasingly approaches the reference route, until the parking route coincides with the reference route.

6. The method according to claim 5, wherein in the operating mode, the parking route is determined, which adjoins the reference route at a point at which a longitudinal axis of the motor vehicle, when the motor vehicle is moving along the determined parking route, encloses an angle with the longitudinal axis, when the motor vehicle is moving along the reference route, that is smaller than a predetermined angle value.

7. The method according to claim 1, wherein the parking route is determined anew depending only on the current position of the motor vehicle relative to the reference target position and/or depending on the current position of the motor vehicle relative to the reference starting position and taking into account the reference data and/or the sensor data.

8. The method according to claim 1, wherein for recognition of the surrounding area, at least one reference feature of the surrounding area contained in the reference data is recognized using the sensor data.

9. The method according to claim 1, wherein the surrounding area is recognized using reference features even if the parking space is not detected by the sensor device.

10. The method according to claim 1, wherein the surrounding area is recognized using at least one of the following reference features:
   a relative position of a reference object relative to another reference object and/or relative to the parking space;
   a geometric shape of at least one reference object; and
   a colouration of at least one reference object.

11. The method according to claim 1, wherein the reference data and/or the sensor data are recorded using at least one camera and/or using at least one ultrasound sensor of the sensor device.

12. The method according to claim 1, wherein during the parking process, sensor data are also detected by the sensor device and distances of the motor vehicle from recorded objects are determined using the sensor data, wherein the parking route is corrected after fulfilment of a predetermined correction criterion related to the distances.

13. The method according to claim 12, wherein the predetermined correction criterion is that a detected distance is below a predetermined limit.

14. The method according to claim 1, wherein parking in the parking space is carried out autonomously by the driver assistance device on the basis of an input that the driver carries out at an operating device.

15. A driver assistance device for assisting a driver of a motor vehicle when parking in a parking space in a garage, wherein the driver assistance device is configured to:
   detect and store reference data about a surrounding area of the parking space in a learning mode, while the motor vehicle is parked in the parking space controlled by the driver;
   detect, in the learning mode, a reference target position, which is reached by the motor vehicle, and store data with information about this reference target position;
   detect sensor data in a subsequent operating mode different from the learning mode and compare the sensor data with the reference data and, depending on a result of the comparison, to recognize the surrounding area of the parking space using the detected sensor data to determine a current position of the motor vehicle relative to the reference target position; and
   depending on the current position of the motor vehicle relative to the reference target position, determine an automated parking route along which the motor vehicle is parked automatically in the parking space from the current position without driver control, wherein the driver retains ability to initiate or interrupt the automated parking route using control commands.

* * * * *